(12) United States Patent
Ginn et al.

(10) Patent No.: US 9,765,808 B2
(45) Date of Patent: Sep. 19, 2017

(54) SELF-LUBRICATING OSCILLATING PIN JOINT

(71) Applicant: Caterpillar Inc., Peoria, IL (US)

(72) Inventors: Ronald Mark Ginn, Morton, IL (US); Chad M. Arnold, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/004,473

(22) Filed: Jan. 22, 2016

(65) Prior Publication Data

US 2017/0211612 A1   Jul. 27, 2017

(51) Int. Cl.
*F16C 11/04* (2006.01)

(52) U.S. Cl.
CPC .................. *F16C 11/04* (2013.01)

(58) Field of Classification Search
CPC ............ E02F 9/006; Y10T 403/32868; Y10T 403/32893; Y10T 403/32918; Y10T 403/32926; Y10T 403/32861; F16C 11/02; F16C 11/04; F16C 11/045
See application file for complete search history.

(56) References Cited

U.S. PATENT DOCUMENTS

| | | | | |
|---|---|---|---|---|
| 1,439,297 A * | 12/1922 | De Coninck | .......... | B62D 19/00 384/396 |
| 3,072,449 A | 1/1963 | Morley et al. | | |
| 3,843,216 A * | 10/1974 | Campbell | .............. | F16C 33/74 384/152 |
| 4,199,199 A | 4/1980 | Granda | | |
| 4,291,614 A * | 9/1981 | Molle | ..................... | B23P 15/10 123/193.6 |
| 4,400,898 A * | 8/1983 | Christensen | ............ | E02F 9/006 37/444 |
| 4,638,544 A * | 1/1987 | McNeil | ................... | F16C 11/02 16/DIG. 42 |
| 5,327,813 A * | 7/1994 | DeBell | ....................... | F16J 1/16 123/193.6 |
| 5,630,673 A * | 5/1997 | Krzywanos | ............. | E02F 9/006 403/154 |
| 5,850,777 A * | 12/1998 | Marklin | ..................... | F16J 1/16 74/579 E |

(Continued)

FOREIGN PATENT DOCUMENTS

| | | |
|---|---|---|
| DE | 3315004 | 10/1983 |
| EP | 2586700 | 5/2013 |

(Continued)

OTHER PUBLICATIONS

GGB Bearing Technology; "Filament Wound Bearings for the Construction Equipment Market", located at <http://www.ggbearings.com/en/markets/construction.html>, published Jun. 9, 2014, accessed Jan. 19, 2016, 3 pages.

(Continued)

*Primary Examiner* — Daniel Wiley
(74) *Attorney, Agent, or Firm* — Law Office of Kurt J. Fugman LLC

(57) ABSTRACT

A pin for use in a dynamic pin joint is provided that comprises a core member that defines a longitudinal axis and an outer diameter and a self-lubricating material overlay that is disposed about the outer diameter of the core member along at least a portion of the longitudinal axis of the core member.

17 Claims, 4 Drawing Sheets

(56) References Cited

U.S. PATENT DOCUMENTS

| | | | | |
|---|---|---|---|---|
| 6,694,571 | B2* | 2/2004 | Albright | E02F 9/006 16/380 |
| 6,962,458 | B2* | 11/2005 | Takayama | E02F 9/006 403/150 |
| 8,192,104 | B2* | 6/2012 | Mann | F16C 11/02 403/152 |
| 8,561,941 | B2* | 10/2013 | Combes | B64D 27/26 244/54 |
| 2006/0093246 | A1* | 5/2006 | Akita | E02F 9/006 384/279 |
| 2009/0269133 | A1* | 10/2009 | Van Amelsfoort | E02F 3/3604 403/408.1 |
| 2009/0285654 | A1* | 11/2009 | Stecher | F16B 2/04 411/426 |
| 2013/0064483 | A1 | 3/2013 | Masse et al. | |

FOREIGN PATENT DOCUMENTS

| | | |
|---|---|---|
| GB | 1482138 A | 8/1977 |
| GB | 2509944 A | 7/2014 |
| JP | 09273538 | 10/1997 |
| JP | 2008014068 | 1/2008 |
| WO | 2014129718 A1 | 8/2014 |

OTHER PUBLICATIONS

GGB Bearing Technology; "HSG PTFE Plain Bearings—Filament Wound", located at <http://www.ggbearings.com/en/products/filament-wound/hsg.html>, published May 25, 2014, accessed Jan. 19, 2016, 2 pages.

* cited by examiner

SELF-LUBRICATING OSCILLATING PIN JOINT

TECHNICAL FIELD

The present disclosure relates generally to a pin joint for machinery. More specifically, the present disclosure relates to oscillating pin joints of machinery such as construction equipment, mining equipment, and the like.

BACKGROUND

Pin joints for machinery generally fall into two categories. Dynamic joints where structural members move relative to each other and static joints where the structural members do not move. When dynamic joints are present, they may move back and forth making oscillatory motion. As can be imagined, this creates friction and wear that may limit the life of the pin joint. Consequently, the art has developed schemes to limit this friction and prolong the life of the pin joint.

Oscillating pin joints in construction and mining equipment typically include a pin and a mating bearing that is press fit into the surrounding structure. The pin is typically heat treated to provide the material strength needed to carry working loads and also to provide a hard outer diameter surface for improved wear and galling resistance. The pin is often plated to improve wear and corrosion resistance, especially in the un-lubricated "static" bores that support each end of the pin. For most common bearing materials, the pin to bearing interface must be periodically lubricated in order to provide suitable performance and durability.

In such applications, grease lip seals that comprise a steel can or backbone that supports a single urethane lip to protect the pin-to-bearing interface have been developed. However, these seals are not designed for performance and long life in the absence of a lubricant so routine maintenance is vital to maintaining the longevity of the joint.

As can be imagined, the heat treatment and plating operations increase the initial cost of the pin joint, and the need for periodic lubrication reduces machine availability and increases owning and operating cost. Therefore, it is desirable to develop a dynamic pin joint for machinery that is less costly or more robust than has yet been devised.

SUMMARY OF THE DISCLOSURE

A pin for use in a dynamic pin joint is provided that may comprise a core member that defines a longitudinal axis and an outer diameter and a self-lubricating material overlay that is disposed about the outer diameter of the core member along at least a portion of the longitudinal axis of the core member.

A pin joint for a machine is provided that may comprise a first structural member that defines a pin receiving bore, a housing that defines a pin receiving bore, and a pin that is disposed in the bores of the housing and first structural member. The pin may comprise a core member that defines a longitudinal axis and an outer diameter and a self-lubricating material overlay that is disposed about the outer diameter of the core member along at least a portion of the longitudinal axis of the core member.

DETAILED DESCRIPTION

For certain embodiments of the present disclosure, the typical heat treated and highly machined pin is replaced by a pin consisting of a self-lubricating material that is formed or wound around a core member comprising a seamless steel tube, which provides reduced weight, or a steel bar, which may provide additional strength relative to a steel tube, or somewhere in-between a solid steel bar and a thin steel tube. A tube that is not seamless may be used in certain embodiments.

The mating bearing can be any material that provides the hardness and surface finish needed for acceptable performance with the self-lubricating material. The bearing can be eliminated in cost sensitive applications with lower durability requirements. The steel core of the pin can be made from cold formed or pre-hardened material (depending upon the strength required for the application), thereby eliminating the cost to pre-machine and then heat treat the pin before final machining. The self-lubricating material that forms the pin OD (outer diameter) may be inherently corrosion resistant, eliminating the cost for OD plating. The self-lubricating pin OD also eliminates the need to periodically lubricate the pin joint and prevents fretting corrosion between the pin and the un-lubricated "static" bores in the machine.

Figure 1:
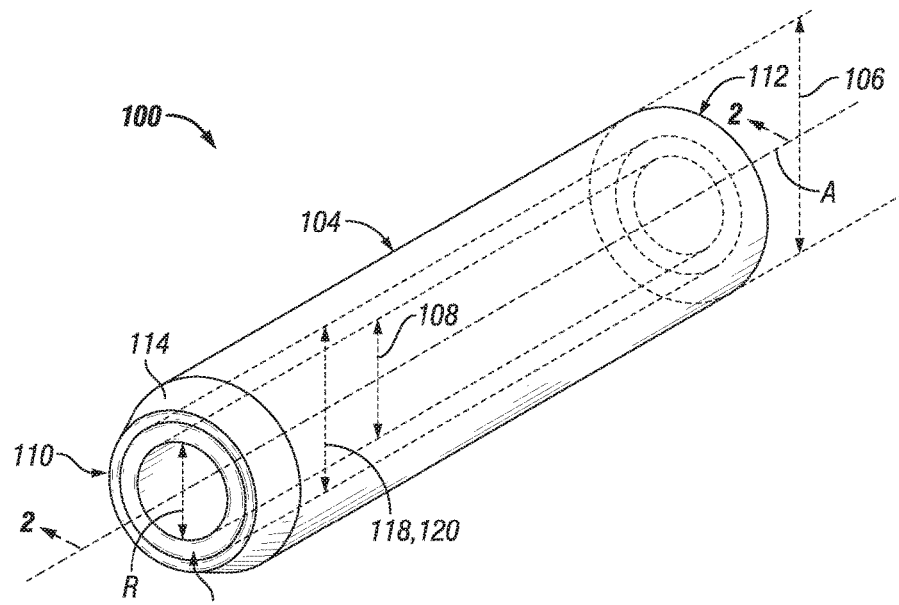
FIG. 1 is a perspective view of a pin having a self-lubricating material surrounding a core tube or shaft.
Figure 2:
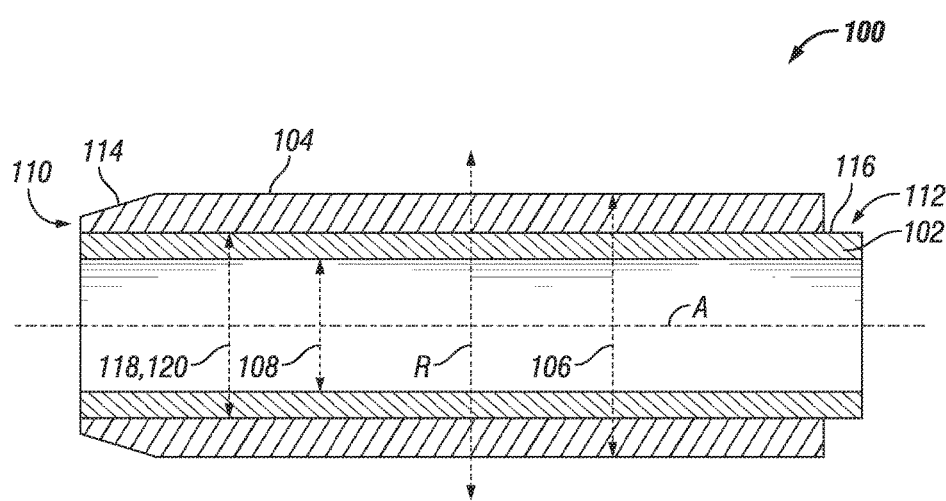
FIG. 2 is a cross-sectional view of the pin with the self-lubricating material surrounding the core tube of FIG. 1 taken along lines 2-2 thereof.

Looking at FIGS. 1 and 2, the linkage pin 100 includes a core member 102 that may be made from stainless steel tubing and be surrounded by a PTFE or other similar self-lubricating material overlay 104 that is disposed about the periphery of the steel tubing, creating the final outer diameter 106 of the pin. The self-lubricating material may be wound about the core member 102, over molded onto the core member 102, pressed onto the core member 102 using a slight press fit, etc. The material for the overlay 104 may provide both wear resistant and self-lubricating properties. The core member may be made from other materials other than stainless steel.

Put another way, a pin 100 for use in a dynamic pin joint such as a sliding pin joint, rotating pin joint, oscillating pin joint, etc. is provided. The pin 100 may comprise a core member 102 that defines a longitudinal axis A, a radial direction R and an outer diameter 106, and a self-lubricating material overlay 104 that is disposed about the outer diameter 106 of the core member 102 along at least a portion of the longitudinal axis A of the core member 102. In some embodiments, the pin 100 is at least partially hollow along the longitudinal axis A of the core member 102, defining an inner diameter 108. In other embodiments, the pin 100 is hollow along the entire longitudinal axis A of the core member 102 as shown in FIGS. 1 and 2. The core member 102 may be solid in other embodiments along the entire longitudinal axis A of the core member 102.

The steel tube used for the core member 102 may be seamless in some but not all embodiments and provides enough shear and bending strength to withstand loads in use and weighs less than a solid pin. In certain embodiments, the size of the inner diameter 108 of the core member 102 could be reduced as necessary to approach the strength of a solid pin if needed or desired.

The pin 100 may include a first end 110 and a second end 112 that are disposed at opposite ends along the longitudinal axis A, wherein the first end 110 includes a lead-in 114 that is disposed about the longitudinal axis A and the second end 112 includes a bare portion 116 that is disposed about the longitudinal axis A. For some embodiments, the lead-in 114 is a chamfer but other transitional geometry such as a blend may be used. The lead-in chamfer may be generous and the bare portion of the tubing that lacks the overlay may allow the attachment of a flag plate as will be described later herein. More specifically as shown in FIG. 2, the material overlay 104 at the first end 110 includes a lead-in 114 that is disposed about the longitudinal axis A and the core member 102 at the second end 112 includes a bare portion 116 that is disposed about the longitudinal axis A.

In some embodiments, the overlay 104 is wound about the outer diameter 118 of the core member 102 along at least a portion of the longitudinal axis A of the core member 102. In some embodiments such as that shown by FIGS. 1 and 2, the overlay 104 is disposed about the outer diameter 118 of the core member 102 along a majority of the longitudinal axis A of the core member with no gaps. In other embodiments, the overlay may cover the outer diameter of the core member intermittently so as to only cover those portions that make moving contact with other components of a pin joint.

Moreover as shown by FIGS. 1 and 2, the overlay 104 defines the outer diameter 106 of the pin 100 that is substantially consistent along at least a portion of the longitudinal axis A and an inner diameter 120 that is substantially coextensive with the outer diameter 118 of the core member 102 along at least a portion of the longitudinal axis A of the core member 102. That is to say, the inner diameter of the overlay and the outer diameter of the overlay do not change significantly over much of the length of the pin along the longitudinal axis.

Figure 3:
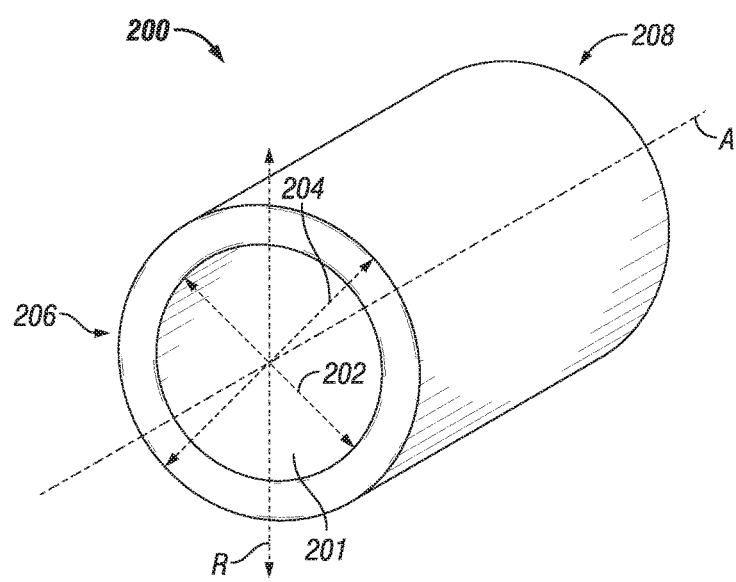
FIG. 3 is a perspective view of a sleeve bearing that is configured to surround the pin with self-lubricating material surrounding the core tube as shown in FIGS. 1 and 2.

Looking at FIG. 3, a plain sleeve bearing 200 may be provided that is capable of surrounding the pin 100 via pin receiving bore 201. It may match the hardness for a standard pin to satisfy the requirements usually desirable for the surface forming the outer diameter of a pin. This material could be stainless steel, providing corrosion resistance. Alternatively, the sleeve bearing 200 may be some other nonferrous material. The sleeve bearing may not be needed for some applications. There is typically some clearance between the inner diameter 202 of the bearing 200 and the outer diameter 106 of the pin 100, while the outer diameter 204 of the bearing 200 may be lightly pressed into a bearing receiving bore of the pin joint as will be described shortly with reference to FIG. 4. The bearing 200 defines a longitudinal axis A, radial direction R, and first and second ends 206, 208 that are diametrically opposing each other along the longitudinal axis A.

The pin shown and described with reference to FIGS. 1 and 2 may use a traditional flag plate or may be retained relative to structural members of a pin joint using other methods including another flag plate configuration and an alternate pin retention mechanism as will be discussed later herein with reference to FIGS. 4 thru 6.

Other examples of self-lubricating materials that could be used for the overlay include glass-filled PTFE, unfilled PTFE, lubricated Nylon (PA), POM (Polyoxymethylene), PEEK, PAI, PPS, PI, PPA, fiberglass composite, carbon-fiber composite, oil-impregnated powdered metal, molybendum disulphide impregnated graphite, etc. Any other suitable self-lubricating material may also be used.

INDUSTRIAL APPLICABILITY

The pin and bearing of FIGS. 1 thru 3 are suitable for use with pin connections or joints such as those used for moving booms and sticks or track assemblies or other mechanisms as are used on construction or mining machinery and the like. It will be appreciated by those skilled in the art that other types of machines may benefit from these pin joints as well. Machinery may be sold with a pin and/or bushing already installed in one or more pin joints. Alternatively, the pin and/or bushing may be sold as a replacement parts for maintaining or upgrading such joints in the field. Furthermore, this type of pin could be remanufactured without sacrificing fatigue life since no heat treatment is involved.

Figure 4:
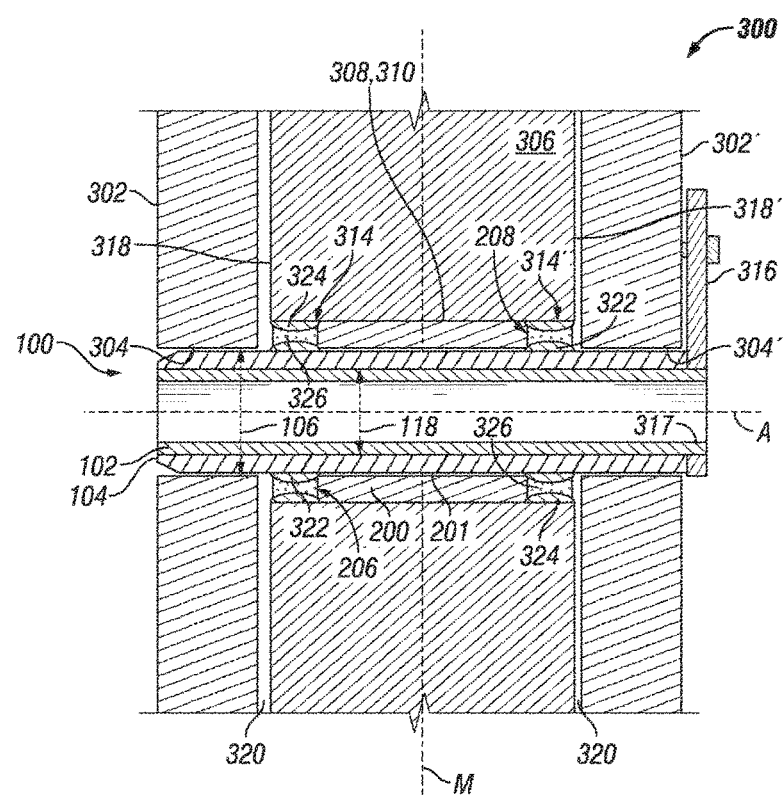
FIG. 4 is a cross-sectional view of a pin joint for a machine that uses the pin of FIGS. 1 and 2 and the sleeve bearing of FIG. 3.

FIG. 4 depicts such a pin joint 300 for a machine. The pin joint 300 comprises a first structural member 302 that defines a pin receiving bore 304, a housing 306 that defines a pin receiving bore 308, a pin 100 that is disposed in the bores 308, 304 of the housing 306 and the first structural member 302, wherein the pin 100 comprises a core member 102 that defines a longitudinal axis A and an outer diameter 106 and a self-lubricating material overlay 104 that is disposed about the outer diameter 118 of the core member 102 along at least a portion of the longitudinal axis A of the core member 102.

For this embodiment as shown by FIG. 4, the housing 306 further defines a bearing receiving bore 310 that is coextensive with the pin receiving bore 308 of the housing 310. The pin joint 300 further comprises a bearing 200 that is disposed in the bearing receiving bore 310. The bearing 200 defines a pin receiving bore 201 and the pin 100 is disposed in the pin receiving bore 201 of the bearing 200. The pin joint may comprise a second structural member 302' that defines a pin receiving bore 304' and the pin 100 may be disposed in the pin receiving bore 304' of the second structural member 302'.

FIGS. 3 and 4 depict that the bearing 200 defines a longitudinal axis A and first and second ends 206, 208 that are diametrically opposing each other along the longitudinal axis A. The pin joint 300 further comprises a first seal assembly 314 that is disposed in the bearing receiving bore 310 of the housing 306 adjacent the first end 206 of the bearing 200 and a second seal assembly 314' that is also disposed in the bearing receiving bore 310 of the housing 306 adjacent the second end 208 of the bearing 200.

The seal assembly may be any type of seal known or that will be devised in the art that is suitable to help prevent debris from entering between the pin and the bearing, etc. It is contemplated that these seal assemblies may not be necessary for joints used in less aggressive environments and for those that lack a bearing. Therefore, these other embodiments are also included in the present disclosure.

The seal assembly 314 includes an inner seal member 322 that is press fit about the pin 100 and an outer seal member 324 that is press fit into the bearing receiving bore 308 and contacts the bearing housing 306. A press fit may be provided on a side to hold the seal assembly 314 in position. Alternatively, there may be a slip fit between inner diameter of the inner seal member and the outer diameter of the pin while a press fit may be present between the outer diameter of the outer seal member and the housing. The inner and outer seal members 322, 324 may have a biasing member 326 located between them in the seal assembly 314.

As shown, the pin connection 300 is substantially symmetrical about a midplane M. Hence, two structural members 302, 302' and seal assemblies 314, 314' are found on either side of the midplane M. This may not be true for other embodiments. A flag plate 316 is provided that is fixedly attached to a structural member 302' and the bare portion of the pin 314, helping to prevent any movement of the pin. The fixed attachment of the flag plate 316 to the pin 100 may be achieved using welding while the fixed attachment of the plate 316 to the structural member may be achieved via a fastener. Other methods of retaining the pin and preventing rotation of the pin are possible. Other embodiments are contemplated wherein there is some movement of the pin 100 during rotation of the pin connection 300.

During assembly, the lead-in 114 on the pin 100 provides guidance as the pin is inserted into the pin receiving bore 304' of the second structural member 302' and encounters the bearing 200, first structural member 302, etc. as the pin moves from right to left in FIG. 4. Once the first end 110 of the pin 100 is approximately flush with the side surface of the first structural member 302, then the bare portion 116 remains proud of the side surface of the second structural member 302', facilitating the attachment of the flag plate 316. As shown, the pin 100 extends into an aperture 317 of the flag plate 316 so the second end 112 of the pin is flush with the flag plate 316, allowing the flat plate and pin to be attached to each other.

For this embodiment, the structural member 302 is fixed and the housing 306 is movable relative to the structural member, allowing oscillating movement. The opposite may be true for other embodiments or other types of motion may be allowed such as oscillating movement between both the structural member and the housing. Also, the seal assemblies 314, 314' are flush or recessed compared to the sidewalls 318 of the bearing housing 306 along the longitudinal axis A, helping to protect the seal assemblies 314, 314' from damage. Debris, water, dirt etc. is inhibited from entering the pin receiving bore 201 of the bearing 200 and the bearing receiving bore 308 of the housing 306, helping to prolong the life of the pin connection 300 without requiring maintenance.

Figure 5:
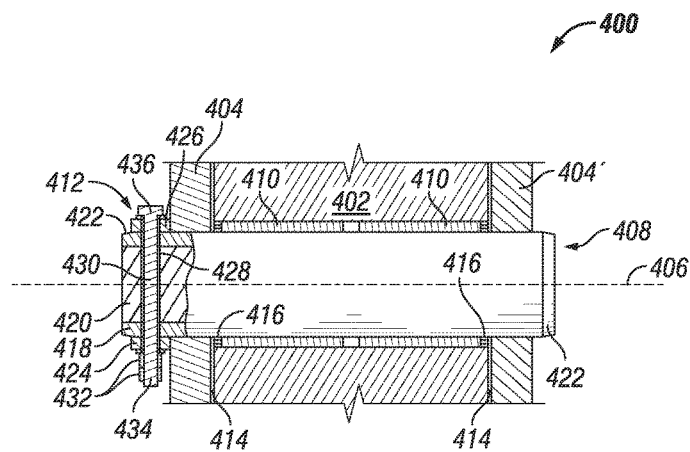
FIGS. 5 and 6 show side and front views of another pin joint that uses a pin similar to that of FIGS. 1 and 2.
Figure 6:
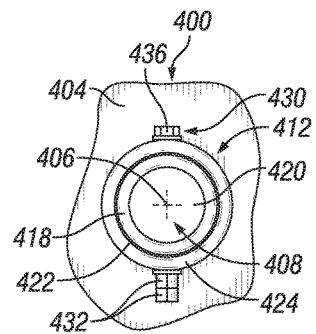

FIGS. 5 and 6 show another pin joint 400 that may use a pin construction that is similar to that shown in FIGS. 1 and 2. This pin joint 400 is similarly constructed to that of FIG. 4 and comprises a housing 402, first and second structural members 404, 404' on either side of the housing 402 along the longitudinal axis 406 of the pin 408, one or more sleeve bearings 410 that surround the pin 408, and a pin retention structure 412. The first and second structural members 404, 404' define gaps 414 between them and the housing 402. Seals 416 may be placed at the ends of a bearing or bearings 410 that are immediately adjacent these gaps 414 to prevent the ingress of dirt, debris, etc. These seals 416 and/or bearings 410 may be omitted in other applications where the environment is less aggressive.

For this embodiment, the pin 408 has a self-lubricating material overlay 418 that covers the core member 420 along the entire length of the pin 408 along the longitudinal axis 406. The core member 420 is solid for this embodiment. Lead-in chamfers 422 are provided to facilitate the insertion of the pin into the bores of the structural members, housing, bearings, seals, etc.

The details of the pin retention structure 412 will now be discussed in more detail. A collar 424 is welded or otherwise attached to the side of a structural member 404. The collar 424 defines a hole 426 that extends completely through the diameter of the collar 424 from one side to the other. This hole 426 may be aligned with the cross-bore 428 of the pin 408 that extends in a direction that is perpendicular to the longitudinal axis 406 of the pin 408 by rotating the pin 408 about the axis appropriately. A bolt 430 is inserted through the hole 426 in the collar 424 and cross-bore 428 of the pin 408, preventing rotational movement about the axis 406 and translation of the pin 408 along the axis 406. Two nuts 432 are then threaded onto the threads of the free end 434 of the bolt 432 until the nuts and the head 436 of the bolt squeeze firmly onto the collar, locking everything into place. The bolt is prevented from falling off the pin retention structure by the clamping force provided by the nuts.

Other components may be used in the pin joints such as a thrust washer that may prevent rubbing of the housing against the structural member as the joint moves. In such a case, the thrust washer may extend into the gaps or clearance areas 320, 414 positioned between the housing and the structural member.

While most of the embodiments discussed herein are dry lube applications, so called since an external lubricating system is often not needed such as oil or grease that is pumped into the pin joint, it is contemplated that other industrial applications may be suitable for use with a pin that has a self-lubricating material overlay as discussed herein and are therefore within the scope of the present disclosure even if not specifically mentioned.

It will be appreciated that the foregoing description provides examples of the disclosed design and function. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A pin for use in a dynamic pin joint, the pin comprising: a core member that defines a longitudinal axis and an outer diameter; and a self-lubricating material overlay that is disposed about the outer diameter of the core member along at least a portion of the longitudinal axis of the core member, wherein the material overlay defines an outer diameter that is substantially consistent along at least a portion of the longitudinal axis; and wherein the pin includes a first end and a second end that are disposed at opposite ends along the longitudinal axis, wherein the material overlay at the first end includes a lead-in that is disposed about the longitudinal axis and the core member at the second end includes a bare portion that is disposed about the longitudinal axis.

2. The pin of claim 1 wherein the pin is at least partially hollow along the longitudinal axis of the core member.

3. The pin of claim 2 wherein the pin is hollow along the entire longitudinal axis of the core member.

4. The pin of claim 1, wherein the self-lubricating material overlay includes PTFE.

5. The pin of claim 1, wherein the core member includes stainless steel.

6. The pin of claim 1 wherein the overlay is wound about the outer diameter of the core member along at least a portion of the longitudinal axis of the core member.

7. The pin of claim 1 wherein the overlay is disposed about the outer diameter of the core member along a majority of the longitudinal axis of the core member.

8. The pin of claim 1 wherein the overlay defines an inner diameter that is substantially coextensive with the outer diameter of the core member along at least a portion of the longitudinal axis of the core member.

9. A pin joint for a machine comprising:
a first structural member that defines a pin receiving bore;
a housing that defines a pin receiving bore;
a pin that is disposed in the bores of the housing and the first structural member;
wherein the pin comprises a core member that defines a longitudinal axis and an outer diameter and a self-lubricating material overlay that is disposed about the outer diameter of the core member along at least a portion of the longitudinal axis of the core member, the self-lubricating material overlay defining a consistent outer diameter; and
further comprising a second structural member that defines a pin receiving bore and the pin is disposed in the pin receiving bore of the second structural member, wherein the pin includes a first end and a second end that are disposed at opposite ends along the longitudinal axis, wherein the material overlay at the first end includes a lead-in that is disposed about the longitudinal axis and the core member at the second end includes a bare portion that is disposed about the longitudinal axis.

10. The pin joint of claim 9 wherein the housing further defines a bearing receiving bore that is coextensive with the pin receiving bore of the housing, the pin joint further comprising a bearing that is disposed in the bearing receiving bore, the bearing defining a pin receiving bore and the pin is disposed in the pin receiving bore of the bearing.

11. The pin joint of claim 10 wherein the bearing defines a longitudinal axis and first and second ends that are diametrically opposing each other along the longitudinal axis, the pin joint further comprising a first seal assembly that is disposed in the bearing receiving bore of the housing adjacent the first end of the bearing and a second seal assembly that is disposed in the bearing receiving bore of the housing adjacent the second end of the bearing.

12. The pin joint of claim 10 wherein the bearing comprises stainless steel.

13. The pin joint of claim 9 further comprising a flag plate that is attached to the bare portion of the pin and the second structural member.

14. The pin joint of claim 9 wherein the overlay comprises PTFE that is wound about the outer diameter of the core member of the pin.

15. The pin joint of claim 9 wherein the core member is hollow along at least a portion of the longitudinal axis.

16. The pin joint of claim 15 wherein the core member is hollow along the majority of the longitudinal axis, defining an inner diameter for the core member.

17. The pin joint of claim 9 wherein the housing oscillates relative to the first structural member.

* * * * *